United States Patent
Wang et al.

(10) Patent No.: US 10,564,012 B2
(45) Date of Patent: Feb. 18, 2020

(54) METHOD OF IMPROVING MEASUREMENT SPEED OF DISTRIBUTED OPTICAL FIBER SENSOR BY ADOPTING ORTHOGONAL SIGNALS AND SYSTEM THEREOF

(71) Applicant: University of Electronic Science and Technology of China, Chengdu, Sichuan (CN)

(72) Inventors: Zinan Wang, Sichuan (CN); Ji Xiong, Sichuan (CN); Lianlian Xie, Sichuan (CN); Yunjiang Rao, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 73 days.

(21) Appl. No.: 15/874,672

(22) Filed: Jan. 18, 2018

(65) Prior Publication Data

US 2018/0156642 A1 Jun. 7, 2018

(30) Foreign Application Priority Data

Aug. 8, 2017 (CN) .......................... 2017 1 0672585

(51) Int. Cl.
*G01D 5/353* (2006.01)
*G01P 3/36* (2006.01)
*G01D 5/26* (2006.01)

(52) U.S. Cl.
CPC ......... *G01D 5/35335* (2013.01); *G01D 5/268* (2013.01); *G01D 5/35358* (2013.01); *G01P 3/36* (2013.01)

(58) Field of Classification Search
CPC ................................................... G01D 5/35335
USPC .............................................................. 356/73.1
See application file for complete search history.

(56) References Cited

U.S. PATENT DOCUMENTS

| | | | | |
|---|---|---|---|---|
| 2002/0196492 | A1* | 12/2002 | Trisnadi | G02B 6/2713 398/79 |
| 2006/0244973 | A1* | 11/2006 | Yun | A61B 5/0059 356/511 |
| 2007/0114751 | A1* | 5/2007 | Trifonov | H04L 9/0858 280/277 |
| 2010/0080560 | A1* | 4/2010 | Mertz | H04B 10/67 398/76 |

(Continued)

*Primary Examiner* — Tarifur R Chowdhury
*Assistant Examiner* — Omar H Nixon

(57) ABSTRACT

A method of improving measurement speed of distributed optical fiber sensors by adopting orthogonal signals and the system thereof is disclosed, which is related to the optical fiber sensor field and solves the problems that conventional technology will increasing the bandwidth of the received signal, reducing the signal-to-noise ratio of the received signal or distortion the spatial resolution of the system. The method comprises steps of generating N periodic orthogonal optical pulse sequence; injecting the N periodic orthogonal optical pulse sequence into the optical fiber under test(5); collecting the scattered light signal; demodulating the scattered light signal with the local oscillating light and then converting into digital signals; extracting the scatter information of the orthogonal optical pulses from the collected digital signals; and arranging the scattered information in order of precedence of the infusion. The measurement speed of the distributed optical fiber sensors is improved by N−1 times.

2 Claims, 2 Drawing Sheets

(56) References Cited

U.S. PATENT DOCUMENTS

| | | | |
|---|---|---|---|
| 2010/0215357 A1* | 8/2010 | Westlund | H04B 10/61 398/16 |
| 2011/0150504 A1* | 6/2011 | Ellis | H04B 10/60 398/203 |
| 2012/0274927 A1* | 11/2012 | Li | G01K 11/32 356/73.1 |
| 2013/0216176 A1* | 8/2013 | Li | G01K 11/32 385/12 |
| 2014/0268166 A1* | 9/2014 | Flanders | G01B 9/02004 356/479 |
| 2015/0288555 A1* | 10/2015 | Kanno | H04L 27/2613 370/350 |
| 2015/0381468 A1* | 12/2015 | Murphy | H04L 43/50 375/227 |
| 2016/0245719 A1* | 8/2016 | Zou | G01M 11/3109 |
| 2016/0277058 A1* | 9/2016 | Zhai | H04B 1/44 |

* cited by examiner

US 10,564,012 B2

METHOD OF IMPROVING MEASUREMENT SPEED OF DISTRIBUTED OPTICAL FIBER SENSOR BY ADOPTING ORTHOGONAL SIGNALS AND SYSTEM THEREOF

CROSS REFERENCE OF RELATED APPLICATION

This application claims priority under 35 U.S.C. 119(a-d) to CN 201710672585.5, filed Aug. 8, 2017.

BACKGROUND OF THE PRESENT INVENTION

Field of Invention

The present invention relates to a method of improving measurement speed of a distributed optical fiber sensor by adopting orthogonal signals and a system thereof, and more particularly to optical fiber sensor field.

Description of Related Arts

The distributed optical fiber sensor system is a remote detection system. The measurement speed is an important parameter of the DOFS (Distributed Optical Fiber Sensor). In most of the DOFS system, an object is located by calculating on the time interval between sending out a pulse and receiving the pulse reflection (scattering) light. In order to avoid misjudgment, the pulse repeat frequency $f_{scan}$ can and the length of the optical fiber under test (L) should be satisfied $f_{scan} < 2nL/c$, where c denotes a speed of light in vacuum; n denotes a refractive of the optical fiber. The longer the sensing distance, the lower the measurement speed of the system.

There are several ways to improve the measurement speed. A research team in Tel Aviv University in Israel improves the system pulse repeat frequency of OFDR (Optical Frequency-Domain Reflectometer) to a theory boundary of $f_{scan} < 2L/v$ by adopting positive and negative beat signal. A research team in Shanghai institute of optics and fine mechanics improves the pulse repeat frequency of a phase sensitive optical time-domain reflectometer with 9.6 km sensing range to 0.5 MHz by adopting a frequency-division multiplexing technique, but this method will increase the bandwidth of the received signal and decreases the signal-to-noise ratio of the received signal significantly. A research team in Shanghai Jiao Tong University improves pulse repeat frequency by 5 times by adopting the frequency-division multiplexing in TGD-OFDR (Time-Gated Digital Optical Frequency-Domain Reflectometer), this method needs to divide the frequency sweep range to 5 regions and will decrease the spatial resolution of the system by 5 times. A new method for improving the measurement speed without increasing the bandwidth of the received signal, sacrificing the spatial resolution and decreasing the signal-to-noise ratio of the received signal is required.

SUMMARY OF THE PRESENT INVENTION

An object of the present invention is to provide a method of improving measurement speed of distributed optical fiber sensor by adopting orthogonal signals and system thereof to solve the problem that conventional technology will increase the bandwidth of the received signal, reduce the signal-to-noise ratio of the received signal or distort the spatial resolution of the system. The technical solution of the present invention is as follow:

A method of improving a measurement speed of distributed optical fiber sensors by adopting orthogonal signals, comprising steps of:

step 1: generating a periodic orthogonal optical pulse sequence;

step 2: injecting the periodic orthogonal optical pulse sequence into an optical fiber under test in order of precedence and collecting scattered light signals; demodulating the scattered light signals with a local oscillating light, and transforming the demodulated signal into digital signals;

step 3: extracting the scatter information of each of orthogonal optical pulses of the periodic orthogonal optical pulse sequence from collected digital signals; arranging the scatter information in order of precedence of the injecting into the optical fiber under test.

The step 1 further comprises the following steps:

step 1.1: outputting a continuous wave laser emitted by the narrow linewidth laser from a 90% port of a 90/10 coupler; and step 1.2: transforming the continuous wave laser into an up-conversion optical pulse signal or a down-conversion optical pulse signal which is the generated periodic orthogonal optical pulse sequence by a modulation unit driven by shifting frequency electric signals.

The step 2 further comprises the following steps:

step 2.1: injecting the periodic orthogonal optical pulse sequence into the optical fiber under test by a circulator to generate the scattered light signals;

step 2.2: using a 90-degree optical hybrid to carry out an IQ demodulation for the scattered light signals outputted by 3rd port of the circulator and the local oscillating light outputted by a 10% port of the 90/10 coupler; and step 2.3 transforming optical signals after IQ demodulation into electric signals by a balanced detector and transforming the electric signals into the digital signals by a data acquisition card or an oscilloscope.

The step 3 further comprises the following steps:

step 3.1: processing collected digital signals by a positive and negative beat signal separation algorithm and separating the scattered light generated by the up-conversion optical pulse signal and the down-conversion optical pulse signal, and more details are as follows:

converting the collected digital signals to a frequency domain by FFT (Fast Fourier Transform); where the orthogonal signals are a positive frequency part and a negative frequency part of the frequency domain respectively; obtaining time domain signals of the orthogonal signals by IFFT (Inverse Fast Fourier transform) of the positive frequency part and the negative frequency part; and step 3.2: sorting sensing information contained in demodulated two signals according to the order of the orthogonal signals injected into the optical fiber under test.

Furthermore, a signal generator (SG) generating the two channels of orthogonal signals with a frequency of $f_1$ in the step 1.2, and more details are as follows:

generating two pulses with an initial phase of 0° and a delay of nL/c as in-phase signals which are I channel signal, where a math expression of the I channel signal is written as:

$$V_{I1}(t) = V_D \cos(2\pi f_1 t)\text{rect}(t/T) + V_D \cos(2\pi f_1 t)\text{rect}[(t-nL/c)/T]$$

meanwhile, generating two pulses with initial phases of 90° and −90° respectively and a delay of nL/c as the orthogonal signals which called Q channel signals, where a math expression of the Q-signals is written as:

$$V_{Qi}(t)=V_D \cos(2\pi f_1 t+\pi/2)\text{rect}(t/T)+V_D \cos(2\pi f_1 t-\pi/2)\text{rect}[(t-nL/c)/T$$

where L denotes a length of the optical fiber under test; c denotes a speed of light in vacuum; n denotes a refractive index of the optical fiber under test; nL/c denotes a time interval between the up-conversion optical pulse signal and the down-conversion optical pulse signal; a periodic repetition of the up-conversion optical pulse signal and the down-conversion optical pulse optical pulse signal is 2 nL/c; $f_1$ denotes a frequency shift of the modulation unit; $V_D$ denotes a radio-frequency signal amplitude of a modulation; rect denotes a rectangular function; T denotes a pulse width; t denotes a time variable;

an output expression of the up-conversion optical pulse signal and the down-conversion optical pulse signal outputted by the modulation unit in the step 1.2 is as follow:

$$E_i=E_c \cos [2\pi(f_c+f_1)t]\text{rect}(t/T)+E_c \cos [2\pi(f_c-f_1)t]\text{rect}[(t-nL/c)/T]$$

where, $f_c$ denotes a frequency of an incident light; $E_c$ denotes a signal amplitude of an optical signal after modulation;

a modulated signal in the step 2.2 is as below:

$$E_0=AR(z)\exp\{j[2\pi f_1(t-T_z)-2\pi f_c T_z]\}\cdot\text{rect}[(t-T_z)/T]+AR(z)\exp\{-j[2\pi f_1(t-T_z)+2\pi f_c T_z]\}\cdot\text{rect}[(t-nL/c-T_z)/T]$$

wherein, j denotes an imaginary unit; A denotes a response factor of a probe; $T_z$ denotes a delay of receiving scattered light signals on point z on the optical fiber under test at a receiver; R(z) denotes a distribution of a scattered light signal amplitude along the optical fiber under test.

A system of improving a measurement speed of distributed optical fiber sensors by adopting orthogonal signals, comprising:

a signal generating unit for a periodic orthogonal optical pulse sequence;

a signal optical path detection unit for injecting the periodic orthogonal optical pulse signal sequence into an optical fiber under test in order of precedence, collecting scattered light signals, demodulating with the local oscillating light and the scattered light, and then converting the signals after demodulation into digital signals;

a signal processing unit for extracting scatter information of each of orthogonal optical pulses respectively from collected digital signals and sorting sensing information contained in demodulated two signals according to the order of the orthogonal signals injected into the optical fiber under test. Furthermore, the signal generating unit comprises a narrow linewidth laser; a modulation unit for modulating laser emitted from the narrow linewidth laser to the up-conversion optical pulse signal or the down-conversion optical pulse signal; and a signal generating unit for shifting frequency electric signals to drive the modulation unit.

Furthermore, the signal optical path detection unit comprises a circulator connected to the modulation unit; a 90-degree optical hybrid connected to the narrow linewidth laser and a third port of the circulator respectively; the optical fiber under test connected to a second port of the circulator; a balance detector connected to the 90-degree optical hybrid; a data acquisition card or an oscilloscope connected to the balance detector;

where the modulation unit and the 90-degree optical hybrid are connected to the narrow linewidth laser through a 90/10 coupler; the modulation unit is connected to a 90% port of the 90/10 coupler; the 90-degree optical hybrid is connected to a 10% port of the 90/10 coupler.

Furthermore, a phase difference of two channels of signals outputted by the signal generating unit for the shifting frequency electric signals is 90° or −90° with an error of +/−10°; the signal generating unit for the shifting frequency electric signals is a signal generator with two channels of output; or a single channel signal generator and a 90-degree bridge which transforms a single channel electric signal generated by the single channel signal generator into two channels of signals; or a single channel signal generator.

Furthermore, the modulation unit is an I/Q modulator; or an intensity modulator which generates the up-conversion optical pulse signal and the down-conversion optical pulse signal, an optical filter for filtering the up-conversion optical pulse signal or the down-conversion optical pulse signal generated by the intensity modulator and an optical switch for selecting the up-conversion optical pulse signal or the down-conversion optical pulse signal filtered by the optical filter.

The benefits of the present invention by adopting the technical solution are as follow:

1 The present invention takes full advantage of the bandwidth of the measurement channel and breaks the limit of which the single measurement time must exceed the roundtrip time of a pulse. The present invention improves the measurement speed by N−1 times without increasing the signal measurement bandwidth and decreasing the signal-to-noise ratio of the received signal;

2 For a φ-OTDR (Optical Time Domain Reflectometer) system, the spatial resolution is determined by the width of the pulse. The width of the pulse is not changed by adopting the present invention. For the OFDR system, the spatial resolution is determined by the range of sweep frequency. The range of the sweep frequency is not changed by adopting the present invention. So, the spatial resolution is not decreased by adopting the present invention.

3 The present invention is able to be applied in wide varieties of systems, which is able to be adopted by all the heterodyne detection with distributed optical fiber sensor system, such as the φ-OTDR of the heterodyne detection, or the OFDR system of the chirped pulse.

DETAILED DESCRIPTION OF THE PREFERRED EMBODIMENT

In order to better illustrate the target, technical solution and advantages of the present invention, referring to the figures and embodiment, the present invention is further explained. The embodiment described is just for better illustrating the present invention and is not a limit.

Figure 1:
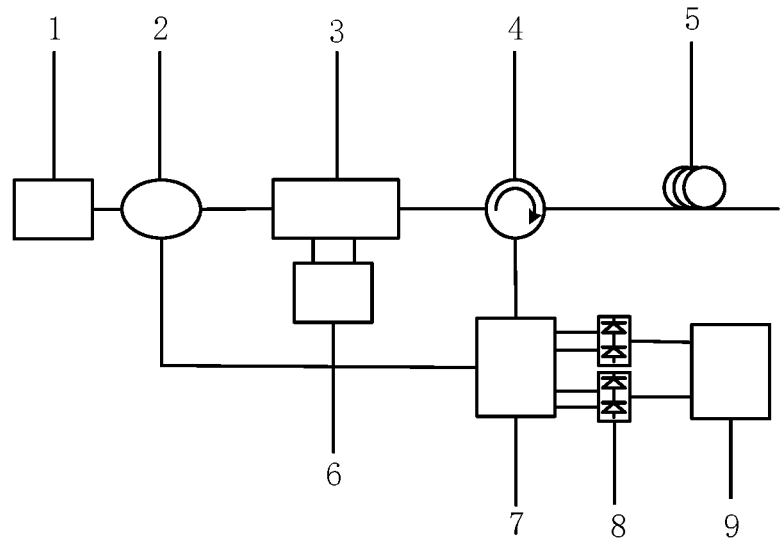
FIG. 1 is a schematic structural diagram of the system of the present invention.
Figure 2:
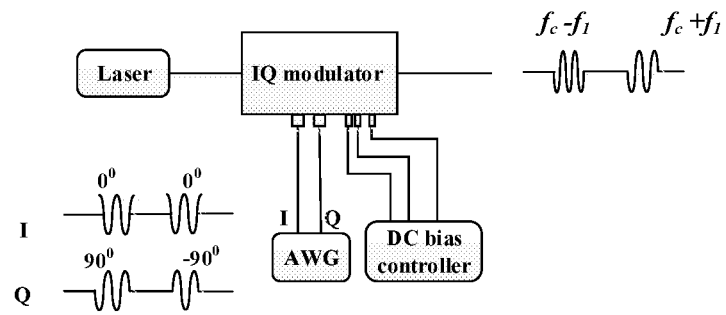
FIG. 2 is a schematic diagram of generating an up-converted optical pulse signal and a down-converted optical pulse signal according to the present invention.

As shown in FIG. 1, a system of improving a measurement speed of distributed optical fiber sensors by adopting orthogonal signals, comprises a signal generating unit for a periodic orthogonal optical pulse sequence; a signal optical path detection unit for injecting the N periodic orthogonal optical pulse signal sequence into an optical fiber under test in order of precedence, collecting scattered light signals, modulating and converting a local oscillating light and the scattered light signals into digital signals; a signal processing unit for extracting scatter information of each of orthogonal optical pulses respectively from collected digital signals and sorting sensing information contained in demodulated two signals according to the order of the orthogonal signals injected into the optical fiber under test; the signal generating unit for a periodic orthogonal optical pulse sequence comprises a narrow linewidth laser 1; a modulation unit 3 for modulating laser emitted from the narrow linewidth laser 1 to an up-conversion optical pulse signal or a down-conversion optical pulse signal; and a signal generating unit 6 for shifting frequency electric signals to drive the modulation unit 3. The modulation unit 3 is a dual parallel Mach-Zehnder modulator (I/Q modulator). An up-conversion optical pulse signal and a down-conversion optical pulse signal are generated by changing a phase of two channels of signal outputted by the signal generating unit 6 to 90° or −90°; the signal generating unit is a two channels output signal generator; the signal optical path detection unit comprises a circulator 4 connected to the I/Q modulator; a 90/10 coupler 2 connected to the narrow linewidth laser 1; a 90-degree optical hybrid 7 connected to the 90/10 coupler 2 and a third port of the circulator 4 respectively; the optical fiber under test 5 connected to a second port of the circulator 4; a balance detector 8 connected to the 90-degree optical hybrid 7; a data acquisition card 9 or an oscilloscope connected to the balance detector 8; the signal processing unit separate scatted (reflected) light signals generated by the up-conversion optical pulse signal and the down-conversion optical pulse signal by a positive and negative beat signal separation algorithm and demodulating sensing information contained in the separated two signals (positive frequency part and negative frequency part signal after IFFT) which is arranged in order of precedence of the infusion into the optical fiber under test.

The detailed structure of the embodiment is as follow: an output end of the narrow linewidth laser 1 is connected to an input port of the 90/10 coupler 2; the 10 percent port of the 90/10 coupler 2 is connected to the local oscillating signal (LO) input end of the 90-degree optical hybrid 7; the 90 percent port of the 90/10 coupler is connected to an input end of the UQ modulator; the radio frequency port of the UQ modulator is connected to the two channels of orthogonal signals of the signal generating unit; I/Q modulator is connected to the signal generating unit; the output port of the UQ modulator is connected to a first port of the circulator 4; the second port of the circulator 4 is connected to the optical fiber under test 5; the third port of the circulator 4 is connected to signal input (SI) port of the 90-degree optical hybrid 7; two channels of UQ output of the 90-degree optical hybrid 7 are connected to two input port of the balanced detector 8; the UQ demodulated light signals are converted to electric signals by the balanced detector 8; the electric signals are converted to the digital signals by the data acquisition card 9 or the oscilloscope.

Figure 3:
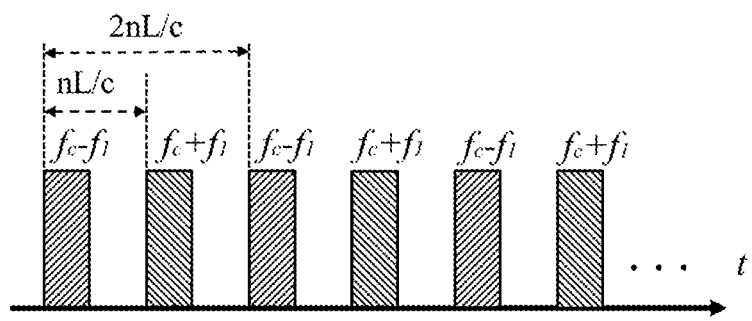
FIG. 3 is a schematic diagram of a time interval between the up-conversion optical pulse signal and the down-conversion optical pulse signal of the present invention.

L denotes a length of the optical fiber under test; c denotes a speed of light in vacuum; n denotes a refractive index of the optical fiber under test; a periodic repetition of the up-conversion optical pulse signal and the down-conversion optical pulse optical pulse signal is 2nL/c; nL/c denotes a time interval between the up-conversion optical pulse signal and the down-conversion optical pulse signal; As shown in the FIG. 3, the rectangle with forward slash denotes the down-conversion optical pulse signal; the rectangle with back slash denotes the up-conversion optical pulse signal. A denotes a response factor of a probe; R(z) denotes a distribution of a scattered light signal amplitude along the optical fiber under test. $T_z$ denotes a delay of receiving a scattered (reflected) light signal on point z on the optical fiber under test at a receiving end; $f_c$ denotes a frequency of incident light; $f_1$ denotes a frequency shift of the modulation unit; $E_c$ denotes a signal amplitude of an optical signal after modulation; $V_D$ denotes a radio-frequency signal amplitude of a modulation. The method of improving measurement speed of a distributed optical fiber sensor by adopting orthogonal signals and a system thereof comprises steps of:

(a) generating two channels of orthogonal signals with a frequency of $f_1$ generating two pulses with an initial phase of 0° and a delay of nL/c as in-phase signals which are I-signals, where a math expression of the I-signals is as below:

$$V_{Ii}(t)=V_D \cos(2\pi f_1 t)\text{rect}(t/T)+V_D \cos(2\pi f_1 t)\text{rect}[(t-nL/c)/T]$$

meanwhile, generating two pulses with initial phases of 90° and −90° respectively and a delay of nL/c as the orthogonal signals which are Q-signals, where a math expression of the Q-signals is as below:

$$V_{Qi}(t)=V_D \cos(2\pi f_1 t+\pi/2)\text{rect}(t/T)+V_D \cos(2\pi f_1 t-\pi/2)\text{rect}[(t-nL/c)/T]$$

where rect denotes a rectangular function; T denotes a pulse width; t denotes a time variable.

(b) modulating the two channels UQ signal into the up-conversion optical pulse signal and the down-conversion optical pulse signal; where in the math expression of the output signal is:

$$E_i=E_c \cos [2\pi(f_c+f_1)t]\text{rect}(t/T)+E_c \cos [2\pi(f_c-f_1)t]\text{rect}[(t-nL/c)/T]$$

(c) UQ demodulating the backscattering sensing signal and the local oscillating light; where the demodulated signal is:

$$E_0=AR(z)\exp\{-j[2\pi f_1(t-T_z)-2\pi f_c T_z]\}\cdot\text{rect}[(t-T_z)/T]+AR(z)\exp\{j[2\pi f_1(t-T_z)+2\pi f_c T_z]\}\cdot\text{rect}[(t-nL/c-T_z)/T]$$

Figure 4:
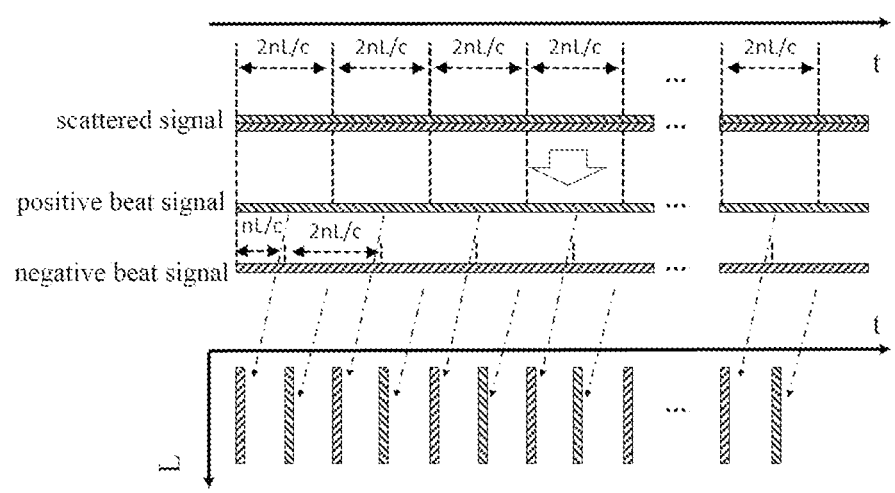
FIG. 4 is a schematic diagram of processing the collected signals by adopting a positive and negative beat signal separation algorithm.

(d) processing the collected signal with the positive and negative beat signal separation algorithm; separating the scatted light generated by the up-conversion optical pulse signal and the down-conversion optical pulse signal; demodulating the sensing information of the separated two signals; arranging the two signals in order of precedence of infusion into the optical fiber; where a signal measurement with a measurement time of nL/c is carried out on the optical fiber of L. The processing is illustrated in FIG. 4. The scattered signal comprises positive and negative beat signals; where the scattered signal is covered into two parts of positive beat signal and negative beat signal by the positive and negative beat signal separation algorithm; demodulating the two parts and arranging the demodulated signal in order of precedence of infusion into the optical fiber; the sensing information along the optical fiber is captured. Compared to the conventional measurement system, the present invention improves the measurement speed by N−1 times; where in the embodiment N=2.

The embodiment is just an illustration of the present invention and not a limitation. Any alteration and modification in the spirit and principle of the present invention is within the protection range of the present invention.

What is claimed is:

1. A method of improving a measurement speed of distributed optical fiber sensors by adopting orthogonal signals, comprising steps of:

step 1: generating a periodic orthogonal optical pulse sequence; wherein one cycle contains N mutually orthogonal signals, and these orthogonal signals are coherently demodulated to share same detector bandwidth, wherein N denotes a total number of orthogonal signals step 2: injecting the periodic orthogonal optical pulse sequence into an optical fiber under test in order of precedence and collecting scattered light signals; demodulating the scattered light signals with a local oscillating light, and transforming the demodulated signal into digital signals; and step 3: extracting scatter information of each of orthogonal optical pulses of the periodic orthogonal optical pulse sequence from collected digital signals; arranging the scatter information in order of precedence of the injecting into the optical fiber under test.

2. A method of an electrical signal generating unit generating two channels of orthogonal electrical pulses with a frequency of $f_1$ named pulses-I and pulses-Q, comprising steps as follow:

generating two pulses with an initial phase of 0° and a delay of nL/c as pulses-I, wherein a math expression of an I channel-signal is written as:

$$V_{Ii}(t) = V_D \cos(2\pi f_1 t) \text{rect}(t/T) + V_D \cos(2\pi f_1 t) \text{rect}[(t-nL/c)/T]$$

meanwhile, generating two pulses with initial phases of 90° and −90° respectively and a delay of nL/c as pulses-Q, wherein a math expression of a Q-channel signal is as below:

$$V_{Qi}(t) = V_D \cos(2\pi f_1 t + \pi/2) \text{rect}(t/T) + V_D \cos(2\pi f_1 t - \pi/2) \text{rect}[(t-nL/c)/T]$$

wherein L denotes a length of the optical fiber under test; c denotes a speed of light in vacuum; n denotes a refractive index of an optical fiber under test; $V_D$ denotes a radio-frequency signal amplitude of a modulation; rect denotes a rectangular function; T denotes a pulse width; t denotes a time variable;

the pulses-I and pulses-Q are respectively used as the i-channel signal and the q-channel signal input IQ modulator to modulate the continuous-wave light, and a generated signal is expressed as $$E_i = E_c \cos[2\pi(f_c+f_1)t]\text{rect}(t/T) + E_c \cos[2\pi(f_c-f_1)t]\text{rect}[(t-nL/c)/T]$$

wherein, $f_c$ denotes a frequency of an continuous-wave light; $E_c$ denotes a signal amplitude of an optical signal after modulation;

Ei is one period of a periodic orthogonal pulse sequence, the period of the periodic orthogonal pulse sequence is 2nL/c;

injecting the periodic orthogonal optical pulse sequence into an optical fiber under test in order of precedence and collecting scattered light signals;

demodulating the scattered light signals with a local oscillating light, a demodulated signal is as below:

$$E_O = AR(z)\exp\{j[2\pi f_1(t-T_z)-2\pi f_c T_z]\}\cdot\text{rect}[(t-T_z)/T] + AR(z)\exp\{-j[2\pi f_1(t-T_z)+2\pi f_c T_z]\}\cdot\text{rect}[(t-nL/c-T_z)/T]$$

wherein, j denotes an imaginary unit; A denotes a response factor of a probe; $T_z$ denotes a delay of receiving a scattered light signal on point z on the optical fiber under test at a receiver; R(z) denotes a distribution of a scattered light signal amplitude along the optical fiber under test;

transforming the demodulated signal into digital signals; wherein the demodulated signal $E_O$ contains two parts of signal, and it can be divided in to frequency domain;

extracting scatter information of each of the orthogonal optical pulses of the periodic orthogonal optical pulse sequence from collected digital signals in the frequency domain; and arranging the scatter information in order of precedence of the injecting into the optical fiber under test.

* * * * *